UNITED STATES PATENT OFFICE.

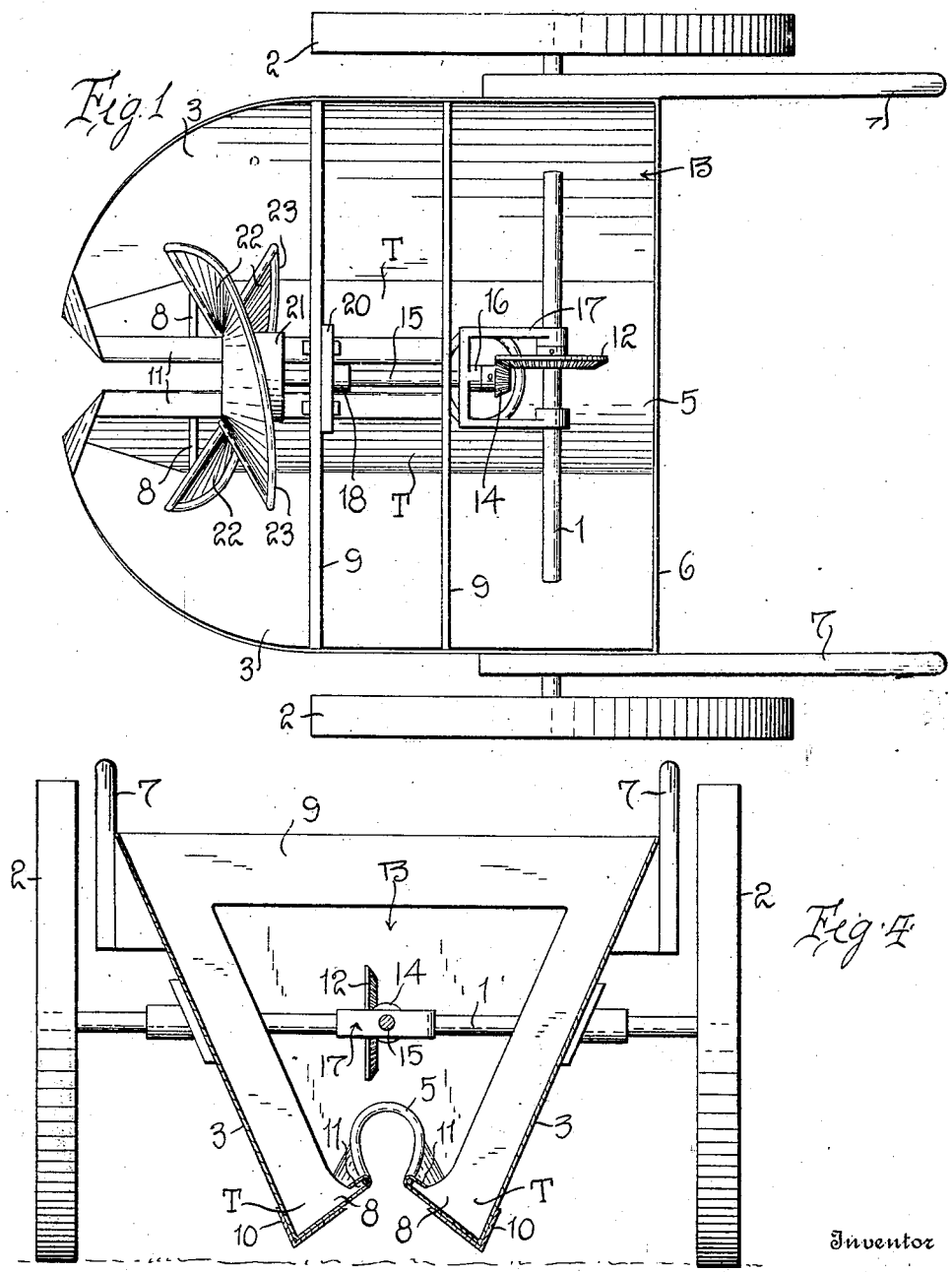

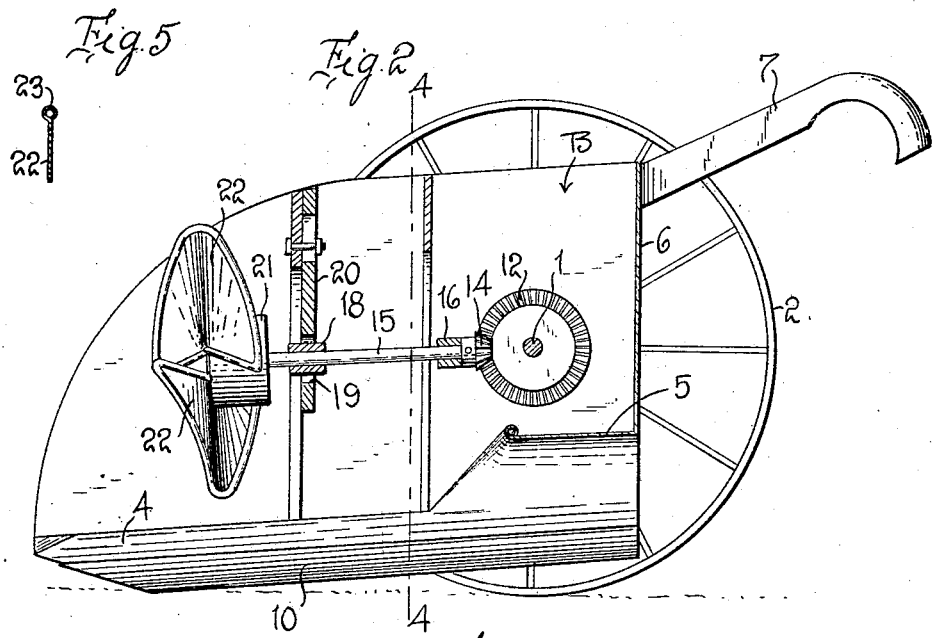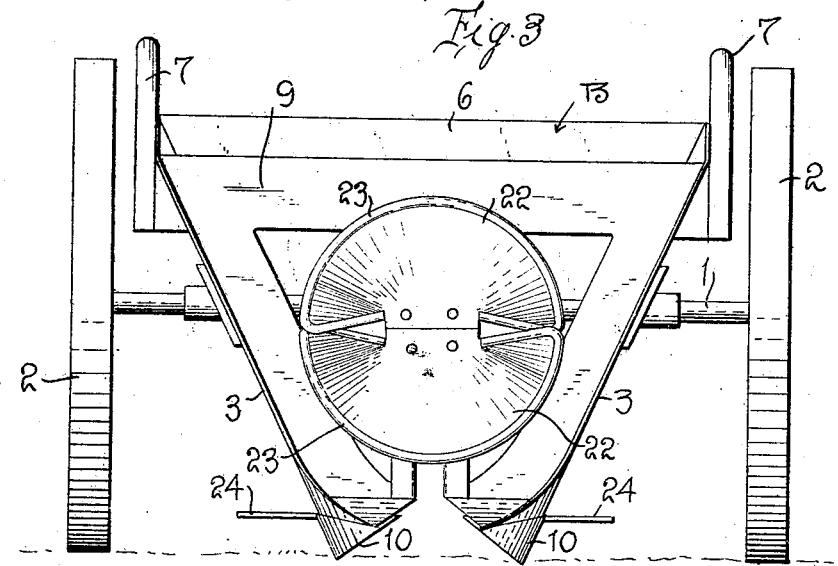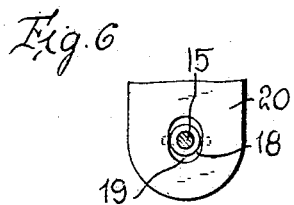

GROVER C. TUCKER, OF HEIBERGER, ALABAMA, ASSIGNOR TO TUCKER IMPLEMENT COMPANY, INC., OF GREENSBORO, ALABAMA, A CORPORATION OF ALABAMA.

INSECT-DESTROYER.

1,189,508.  Specification of Letters Patent.  Patented July 4, 1916.

Application filed December 16, 1915. Serial No. 67,235.

*To all whom it may concern:*

Be it known that I, GROVER C. TUCKER, a citizen of the United States, residing at Heiberger, in the county of Perry and State of Alabama, have invented certain new and useful Improvements in Insect-Destroyers, of which the following is a specification, reference being had to the accompanying drawings.

This invention relates to certain improvements in insect destroyers and has relation more particularly to a device of this general character especially designed and adapted for use in connection with boll weevils, and it is an object of the invention to provide a device of this general character including means whereby a plant is effectively agitated to assure the release of the insects thereon.

Furthermore it is an object of the invention to provide a novel and improved device of this general character wherein a poisoning solution is employed and into which the insects disengaged from the plants are delivered.

It is also an object of the invention to provide a novel and improved insect destroyer wherein is employed containers for poisoning solutions positioned at opposite sides of a row of plants and which are directed entirely below a plant before the agitating means is engaged with the plant, whereby the escape of a released insect is substantially eliminated.

The invention also contemplates for an object to provide a destroyer of this general character including a rotary beater comprising blades between which the foliage of a plant is directed to assure a proper agitation of the plant and whereby a blast of air is imposed upon the plant to further assure the removal of the insects lodged upon the plant.

The invention consists in the details of construction and in the combination and arrangement of the several parts of my improved insect destroyer whereby certain important advantages are attained and the device is rendered simpler, less expensive and otherwise more convenient and advantageous for use, all as will be hereinafter more fully set forth.

The novel features of the invention will be carefully defined in the appended claims.

In order that my invention may be the better understood, I will now proceed to describe the same with reference to the accompanying drawings, wherein—

Figure 1 is a view in top plan of an insect destroyer constructed in accordance with an embodiment of my invention; Fig. 2 is a longitudinal vertical sectional view taken through the device as shown in Fig. 1; Fig. 3 is a view in front elevation of my device as herein set forth; Fig. 4 is a transverse sectional view taken on the line 4—4 of Fig. 2; Fig. 5 is a fragmentary sectional view taken through the marginal portion of the beater as herein set forth; and Fig. 6 is a fragmentary view partly in elevation and partly in section, illustrating in detail a mounting for the beater shaft as herein included.

As disclosed in the accompanying drawings, 1 denotes an axle having fixed to the extremities thereof the traction wheels 2 of predetermined dimensions and loosely mounted upon the axle 1 intermediate the wheels 2, is the body B.

As herein included, the body B comprises the side members 3 arranged on relative inclines and having their lower ends terminating in the upwardly and inwardly extending flanges 4 whereby the troughs T are afforded, and it is to be observed that the rear portions of the flanges 4 are connected to afford the arch 5, said arch being of such a height as to readily permit the plants to pass therebeneath. It is to be understood that in use the sides 3 are adapted to be arranged on opposite sides of a row of plants as are also the troughs T.

The rear ends of the sides 3 and the arch 5 are connected by the back plate 6 and the side plates have also projecting rearwardly therefrom the handles 7 whereby the requisite rocking movement may be given to the body B as the requirements of practice may require, and whereby the same may be readily guided in its travel.

Any conventional poisoning solution is adapted to be placed within the troughs T and in order to maintain said solution in a state of quiescence, I intersect each of the troughs by the partitions 8, certain of said partitions forming a part of the transverse brackets 9 for reinforcing the body B and serving to maintain the side members 3 in their operative relation.

The lower ends of the sides 3 have secured thereto the shoes 10 of suitable material and as the axle 1 is positioned adjacent the rear of the body B, it will be observed that the forward portions of the shoe will engage upon the ground and thereby tend to guide the device in its travel, yet permitting a ready and convenient lateral adjustment so that a plant offset from the row may be readily caused to pass between the troughs T.

It is to be observed that the free marginal portions of the flanges 4 are returned as at 11 to afford lips which positively assure the delivery of an insect, such as a boll weevil, within the troughs and which also serve to prevent the solution within the troughs from splashing over the upper ends of the flanges 4 during the travel of the device.

Intermediate its length, the axle 1 has fixed thereto the beveled gear 12 which is in mesh with the beveled pinion 14 carried by the inner end of the shaft 15, disposed longitudinally of the body B and positioned intermediate the troughs T and as herein embodied, the inner end of the shaft 15 is supported by the bearing 16 carried by the yoke 17 loosely mounted upon the axle 1, while the outer end portion of the shaft 15 is supported by the bearing 18 pivotally supported within the opening 19, formed in the vertically adjustable plate 20. By this arrangement it will be perceived that the outer or free end of the shaft 15 may be vertically adjusted in accordance with the requirements of practice.

The outer or free end of the shaft 15 has fixed thereto a beater comprising a hub 21 from which substantially radiate the substantially semi-circular and diametrically opposed blades 22, the hand of which is such as to afford substantially a spiral action and between which the foliage of the plant is adapted to pass whereby it will be perceived that such foliage is thoroughly agitated which assures the disengagement of the insects from the plant. It is also to be noted that the adjacent ends of the blades at their peripheral portions are in overlying relation whereby the action upon the foliage is materially increased. Furthermore it is to be observed that the rotation of the beater is such as to cause the foliage to move rearwardly which eliminates the possibility of escape of any of the insects disengaged from the plant. Furthermore it will be observed that the hand of the blades 22 is such as to direct air blasts upon the foliage which further assures the release of the insects and which also in practice has been found to prevent undue injury to the plant by the beater. It is also particularly desirable to have the free marginal portions of the blades of the beater beaded as indicated at 23, so that possibility of injury to the plant is further reduced.

It is to be noted that the shaft 15 is of such a length as to position the beater rearwardly of the forward ends of the troughs T and a distance sufficient to assure the forward ends of the troughs to be disposed beneath a plant before the same is operated upon by the beater. This arrangement affords a further means whereby the escape of an insect is eliminated.

Each of the shoes 10 adjacent its forward end is provided with a laterally disposed wing 24 affording a hitch whereby a draft rigging may be suitably engaged with the devices and whereby the draft animal will be caused to travel between the rows of plants, it being self-evident that the line of travel of the device proper may be readily controlled through the medium of the handles 7.

From the foregoing description, it is thought to be obvious that an insect destroyer constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice.

I claim:

1. An insect destroyer comprising a portable body adapted to straddle a row of plants and provided with troughs between which the plants are adapted to pass, and a beater rotating about an axis disposed longitudinally of the troughs and occupying a vertical plane intermediate the troughs, said beater including substantially spirally arranged and diametrically opposed blades between which the foliage of the plant is adapted to travel, said blades serving to create air blasts in a direction rearwardly of the insect destroyer, said blades being substantially semi-circular with the adjacent ends thereof at their peripheral portions in overlying relation.

2. A device of the character described comprising a body mounted for rocking movement, the forward end of said body at its bottom portion being provided with transversely separated troughs, a beater rotatably supported by the body and overlying the troughs and moving about an axis disposed longitudinally of the troughs, shoes carried by the bottom of the body and adapted to engage the surface over which the same traverses, each of said shoes being provided with means affording a hitch.

In testimony whereof I hereunto affix my signature in the presence of two witnesses.

GROVER C. TUCKER.

Witnesses:
W. E. LAWSON,
ANNIE I. HIND.